United States Patent [19]

Straub

[11] 4,362,083

[45] Dec. 7, 1982

[54] CASING FOR AN ARMOURED VEHICLE

[75] Inventor: Hermann Straub, Winterthur, Switzerland

[73] Assignee: Sulzer Brothers Limited, Winterthur, Switzerland

[21] Appl. No.: 99,078

[22] Filed: Nov. 30, 1979

[30] Foreign Application Priority Data

Dec. 4, 1978 [CH] Switzerland .............. 12352/78

[51] Int. Cl.³ ............................................. F41H 7/04
[52] U.S. Cl. ................................................... 89/36 H
[58] Field of Search ............... 52/282; 105/394, 401, 105/402, 409, 410; 109/79; 114/88; 244/131, 132; 296/29, 30; 403/271, 272; 89/36 H, 36 K, 40 B

[56] References Cited

U.S. PATENT DOCUMENTS 2,246,579  6/1941  Ewertz .................................. 403/271
2,489,670  11/1949  Powell .................................... 52/282
3,699,842  10/1972  Grewing et al. ..................... 89/36 H

*Primary Examiner*—Stephen C. Bentley
*Attorney, Agent, or Firm*—Kenyon & Kenyon

[57] ABSTRACT

The casing is welded together from a number of inner wall plates and outer wall plates. Near the abutting plates, an arcuate member in the form of a shell or a tube is welded in, in order to form the edges of the walls. The arcuate members cooperate with the plates to form closed box girders. The welded construction has greatly reduced internal stresses.

11 Claims, 8 Drawing Figures

4,362,083

CASING FOR AN ARMOURED VEHICLE

This invention relates to a casing for an armoured vehicle. More particularly, this invention relates to a double-wall casing of such vehicles.

Heretofore, various types of double-walled casings of armoured vehicles have been known which are comprised of plane or curved plates which are interconnected by welding and section bars which form rounded edges. In many cases, the section bars are of substantially H-shaped or Y-shaped cross-section and are welded by way of flange-like edges to the plates. Such constructions, however, are expensive to produce and also have a disadvantage that relatively large accumulations of material can occur in the edge zones and cause welding stresses.

Accordingly, it is an object of the invention to provide a casing for an armoured vehicle which casing can be welded together in a relatively inexpensive manner.

It is another object of the invention to provide a casing for an armoured vehicle which casing can be welded together without imparting welding stresses therein.

Briefly, the invention provides a casing for an armoured vehicle which casing is comprised of at least one pair of intersecting walls, each of which has at least one plate with a longitudinal edge, an arcuate member disposed between the longitudinal edges of the intersecting walls and welds securing each plate at the edge to the arcuate member so as to define a closed box girder along the edges. This construction provides the particular advantage that the arcuate member together with the plates bridged thereby form a stiff frame near the casing edges which is like a hollow girder. However, there is no severe local stressing in the casing.

In one embodiment, each wall of the casing is of double-walled construction and includes an inner plate and an outer plate. In addition, the arcuate member is in the form of a shell which is welded at two generatrices to the inner wall plates near the edges of the plates in bridging relation while being welded to the outer plates on the outer surface. In addition, each outer plate of a wall has an outer surface which lies in a plane tangential to the outer surface of the shell. In this construction, the plates have a degree of resilience in the shell-bearing regions and, thus, the construction has very reduced internal stresses. This construction is also very rigid as regards relative movement between the parallel outer and inner plates in the plate direction.

In another embodiment, the inner plates of the respective walls may abut each other along a broken edge of at least one of the plates. Alternatively, a metal strip may be welded to and between the inner plates. This obviates any need to bend or otherwise deform one inner plate to define a corner with another inner plate.

The outer plates of each wall may alternatively be disposed such that the outer surfaces lie in planes which intersect at a point outside the arcuate member. In this case, the outer contour of the casing can be diminished relative to the diagonal extent of the casing.

The casing may also be contructed with an arcuate member which is in the form of a tube. In this case, the plates of the walls are welded along longitudinal edges directly to the tube. For this purpose, the tube may be recessed to receive the longitudinal edges of the plates. Also, the outer plates of each wall may be disposed tangentially to the tube or placed in recesses within the tube. The use of the tube as a box girder permits the expansion properties of the casing to be controlled by an appropriate choice of connecting zones.

It is to be noted that the recesses which are provided in the shells or tubes not only facilitate the location of the plates when they are welded but also provide for a consequent reduction in the quantity of welding material.

These and other objects and advantages of the invention will become more apparent from the following detailed description and appended claims taken in conjunction with the accompanying drawings in which:

Figure 1:
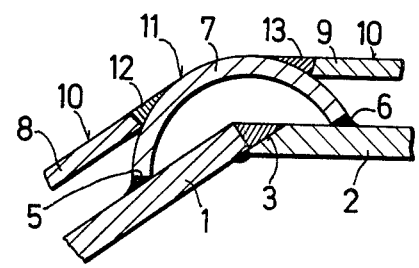
FIG. 1 illustrates a cross-sectional view of a casing of an armoured vehicle which casing having a pair of walls disposed to define an obtuse angle in accordance with the invention.

Referring to FIG. 1, the casing of an armoured vehicle is provided with a pair of intersecting double walls wherein the inner plates 1,2 are welded together to define an obtuse angle. To this end, one plate 2 is formed with a bevel or chamfer 3 at an obtuse angle while the other plate 1 bears on the bevel 3 to be welded thereto. In addition, an arcuate member in the form of a shell 7 is disposed between the longitudinal edges of the outer plates 8, 9 of the respective walls. The shell 7 is bent in a cylindrical shape and has two longitudinal edges 5, 6 which are respectively welded to the two inner wall plates 1, 2. As indicated, the shell 7 bridges over the welded edges of the plates 1, 2 and the outer plates 8, 9 are so placed on the shell 7 that the outer surfaces 10 are each disposed in a tangential plane to the outside surface 11 of the shell 7. In this way, small gaps 12, 13 are disposed between the respective plates 8, 9 and the shell 7. These gaps 12, 13 are then filled up with weld beads as far as the tangential planes as determined by the surfaces 10.

Figure 2:
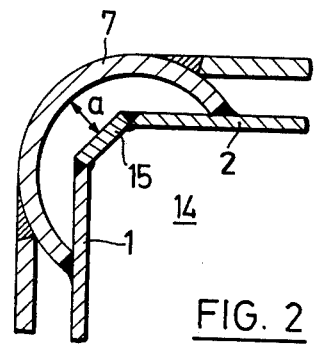
FIG. 2 illustrates a cross-sectional view of a right-angled double-wall connection of a casing of an armoured vehicle in accordance with the invention.

Referring to FIG. 2, wherein like reference characters indicate like parts as above, the inner wall plates 1, 2 of the respective walls may be disposed in right-angled or perpendicular relation to each other. In addition, a metal strip 15 is welded to and between the inner plates 1, 2. This insures that there is an adequate clearance a between the inner wall and the outer wall near the shell 7.

Figure 3:
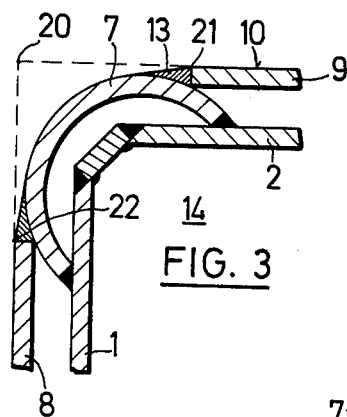
FIG. 3 illustrates a view of an alternative construction to FIG. 2.

Referring to FIG. 3, wherein like reference characters indicate like parts as above, the periphery of the shell 7 may be made smaller than is shown in FIG. 2 with the outer wall plates 8, 9 terminating nearer an imaginary point of intersection 20 of the planes in which the outer surfaces 10 of the outer plates 8, 9 are disposed. In this case, the surfaces of the weld beads 13 cooperate with the surfaces 10 of the outer wall plates to define edges 21, 22. In this construction, the inner space 14 and the between-plates distance is the same as in FIG. 2. However, the diagonal dimension of the casing is smaller. That is, the shell 7 is now located inwardly of the extended planes of the outer surfaces 10 of the plates 8, 9.

Figure 4:
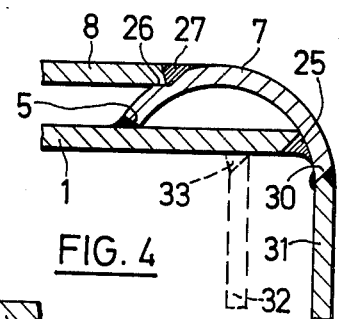
FIG. 4 illustrates a connection between a double wall and a single wall in accordance with the invention.

Referring to FIG. 4, the armoured casing may also be constructed with a connection between a double wall and a single wall. To this end, a first wall is formed of one plate 31 while the second wall is of double-walled construction with a pair of parallel plates 1, 8. As above, the two walls are disposed at an angle with respect to each other and an arcuate shell 7 connects the various plates 1, 8, 31 together. As shown, the shell 7 has a first edge 30 welded to the plate 31, a second longitudinal edge 5 welded to the inner plate 1 and an interior intermediate surface 25 between the edges 5, 30 welded to the longitudinal edge of the inner plate 1. In addition, the exterior surface of the shell 7 is provided with a recess or step 26 which serves as an abutment for the outer wall plate 8. The outer surface of the shell 7 is further welded to the outer plate 8 within the recess by means of a weld seam 27. As indicated in chain lines, an internally disposed plate 32 parallel to the plate 31 may also be secured to the plate 1 by means of a fillet weld 33.

Figure 5:
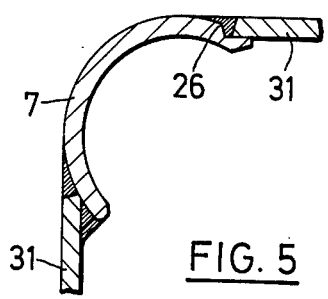
FIG. 5 illustrates a right-angled connection between two single walls in accordance with the invention.

Referring to FIG. 5, the casing may also have intersecting walls which are made of only single plates 31. In this case, the shell 7 is welded at the edges to the longitudinal edges of the plates 31. In this case, the edges of the plates can be welded on one or both sides and can also be formed with longitudinal recesses or steps 26 on which the plates 31 can bear.

Figure 6:
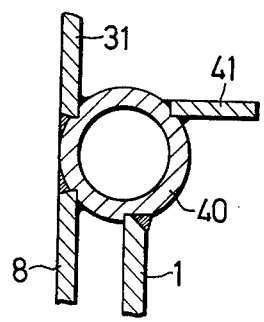
FIG. 6 illustrates a cross-sectional view of a connection utilizing a tube in accordance with the invention.

Referring to FIG. 6, the casing may also be constructed such that the walls are interconnected by a tube 40. For example, as shown, a first wall having a pair of parallel plates 1, 8 has the longitudinal edges of the plates 1, 8 welded to the tube 40 while a second wall including a single plate 31 is welded on an opposite side along a longitudinal edge of the plate 31. As indicated, the plate 31 and outer plate 8 can be disposed in co-planar relation with each other. Also, a partition 41 may be welded to the tube 40 along a longitudinal edge. Such a partition 41 can be disposed between the inner plate 1 and the plate 31.

Figure 7:
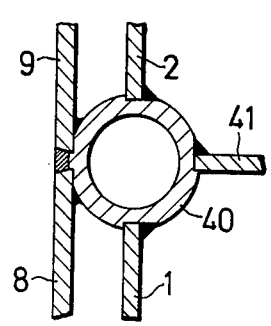
FIG. 7 illustrates a further embodiment of a connection between two double walls utilizing a tube in accordance with the invention.

Referring to FIG. 7, wherein like reference characters indicate like parts as above, the second wall may also be a double-wall formed of two parallel plates 2, 9.

Figure 8:
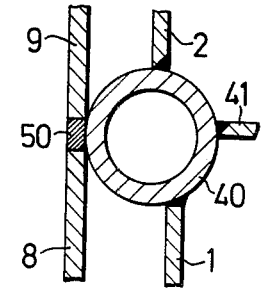
FIG. 8 illustrates a view similar to FIG. 7 with the outer plates of two double walls tangential to a tube.

Referring to FIG. 8, wherein like reference characters indicate like parts as above, the outer plates 8, 9 of the two walls may also be disposed tangentially to the tube 40. In this case, weld material 50 can be provided between the plates 8, 9 to weld the plates directly to the outside surface of the tube 40.

As shown in FIGS. 6 and 7, the tube 40 can be formed with recesses or steps so as to receive the ends of the respective plates. Alternatively, as shown in FIG. 8, the plates and the tube 40 can be secured relative to one another by means for tack-welding (not shown).

Alternatively, instead of using separate plates 8, 9, a single continuous plate provided with a plurality of longitudinally disposed bores can be utilized. In this case, the bores can be filled with weld material 50 to secure the single plate to the tube 40.

An important feature of the above constructions is that the edges of the metal plates have a connection to the tube which is distributed around the periphery thereof and is not limited to a narrow zone. In the resulting constructions, the casing as a whole is more rigid and there is considerable local resilience with less risk of severe local stresses than in previously known casings of this type.

According to another feature of the invention, a chamfered or broken edge of an inner casing plate can be formed by an appropriate bending of the edge of at least one of the inner plates 1, 2 instead of using the metal strip 15 as shown in FIGS. 2 and 3.

I claim:

1. A casing of an armoured vehicle comprising
at least one pair of intersecting walls, one of said walls having an outer plate with a longitudinal edge and an inner plate and the other of said walls having at least one outer plate with a longitudinal edge;
an arcuate shell between said longitudinal edges of said intersecting walls, said arcuate shell having a curvilinear cross-section with a pair of edges; and
welds securing said edges of said shell to respective plates of said plates and each said plate to said shell to define a closed box girder along said longitudinal edges.

2. A casing as set forth in claim 1 wherein each said outer plate has an outer surface tangential to said shell.

3. A casing as set forth in claim 1 wherein said shell has at least one recess therein to receive a respective plate therein.

4. A casing of an armoured vehicle comprising
a first wall having a pair of parallel plates;
a second wall having a pair of parallel plates, said second wall being disposed at an angle to said first wall with an inner plate of each wall welded to each other; and
an arcuate shell having a pair of edges welded respectively to said inner plates of said walls in bridging relation and being welded to the outer plate of each wall intermediately of said edges.

5. A casing as set forth in claim 4 wherein each said outer plate has an outer surface disposed in a plane tangential to said shell.

6. A casing as set forth in claim 4 wherein said walls define an obtuse angle with one of said inner plates disposed on an edge of the other of said inner plates.

7. A casing as set forth in claim 4 which further includes a metal strip welded to and between said inner plates in spaced relation to said shell.

8. A casing of an armoured vehicle comprising
a first wall including at least one plate;
a second wall having a pair of parallel plates, said second wall being disposed at an angle to said first wall;
an arcuate shell having a first edge welded to said plate of said first wall, a second edge welded to the inner plate of said second wall, an interior intermediate surface between said edges welded to an edge of said inner plate, and an exterior surface welded to the outer plate of said second wall.

9. A casing of an armoured vehicle comprising
at least one pair of intersecting walls, each of said walls having an outer plate with a longitudinal edge and an inner plate;
an arcuate shell between said longitudinal edges of said intersecting walls; and
welds securing each said outer plate and each said inner plate to said shell at two generatrices thereof and near said edges of said inner plates in bridging relation to define a closed box girder along said edges.

10. A casing as set forth in claim 9 wherein said inner plates abut each other along a broken edge of at least one of said inner plates.

11. A casing as set forth in claim 9 which further comprises a metal strip welded to and between said inner plates.

* * * * *